(12) United States Patent
Kiyosawa

(10) Patent No.: US 6,318,210 B1
(45) Date of Patent: Nov. 20, 2001

(54) PHASE REGULATING APPARATUS

(75) Inventor: Yoshihide Kiyosawa, Nagano-ken (JP)

(73) Assignee: Harmonic Drive Systems, Inc., Tokyo (JP)

( * ) Notice: Subject to any disclaimer, the term of this patent is extended or adjusted under 35 U.S.C. 154(b) by 0 days.

(21) Appl. No.: 09/424,390

(22) PCT Filed: Mar. 25, 1998

(86) PCT No.: PCT/JP98/01350

§ 371 Date: Feb. 3, 2000

§ 102(e) Date: Feb. 3, 2000

(87) PCT Pub. No.: WO99/49238

PCT Pub. Date: Sep. 30, 1999

(51) Int. Cl.⁷ .............................. F16H 1/32
(52) U.S. Cl. .................................. 74/640
(58) Field of Search ............................ 74/640

(56) References Cited

U.S. PATENT DOCUMENTS

| | | | |
|---|---|---|---|
| 4,363,270 | * 12/1982 | Ury et al. | 101/180 |
| 4,951,518 | * 8/1990 | Hendershot | 74/640 X |
| 4,974,470 | 12/1990 | Ishikawa et al. | 74/640 |
| 5,042,380 | * 8/1991 | Quinci | 101/217 |
| 5,123,300 | * 6/1992 | Himmelein et al. | 74/640 |
| 5,417,186 | * 5/1995 | Elrod et al. | 123/90.17 |
| 5,562,031 | * 10/1996 | Garner et al. | 101/148 |
| 5,937,710 | * 8/1999 | Gould et al. | 74/640 |

FOREIGN PATENT DOCUMENTS

| | | |
|---|---|---|
| 59-190541-A | * 10/1984 | (JP) . |
| 59-212556 | 12/1984 | (JP) . |
| 6-337045 | 12/1994 | (JP) . |
| 10-100372 | 4/1998 | (JP) . |

* cited by examiner

Primary Examiner—Charles A Marmor
Assistant Examiner—Ankur Parekh
(74) Attorney, Agent, or Firm—Burns, Doane, Swecker & Mathis, L.L.P.

(57) ABSTRACT

A phase regulating speed reducer(20) in a phase regulating apparatus (100) has first and second cup-shaped wave gear gear drives (30,40). A first wave generator (33) for the first wave gear drive (30) is connected to a phase regulating motor. A first flexible external gear (32) and a second flexible external gear (42) of the second wave gear drive (40) are fixed together by a plurality of fastening bolts (60) so that these external gear are rotated together in a back-to-back state. A second wave generator (43) for the second wave gear drive (40) is made non-rotatable. During a normal power transmission time, the phase regulating motor is not operated. Therefore, the reduction ratio of the two drives is set equal, an input rotation of the first wave gear drive (30) into a first rigid internal gear (31) is outputted at the same rotational frequency from a second rigid internal gear (41). According to this arrangement, a phase regulating apparatus having a low rotation transmission error can be manufactured at a low cost.

4 Claims, 4 Drawing Sheets

PRIOR ART

PHASE REGULATING APPARATUS

TECHNICAL FIELD

The present invention relates to a phase regulating apparatus for performing phase regulation between rotary bodies rotatingly driven by the same driving motor.

BACKGROUND ART

In a drive system for a printing roll or the like, it is possibly required to perform phase regulation between two rolls rotatingly driven by the same driving motor. Therefore, the applicant has proposed a phase regulating apparatus having a construction shown in FIG. 5, for example.

A phase regulating apparatus 1 shown in FIG. 5 performs phase regulation between printing rolls 2 and 3 rotatingly driven by the sa driving motor 4. The roll 2 is directly driven by the driving motor 4. The roll 3 is driven by the driving motor via a rotating force transmission path constituted of a gear train and a phase regulating speed reducer 5. The phase regulating speed reducer 5 is driven by a phase regulating motor 6.

The phase regulating speed reducer 5 is a differential gear unit, as which a wave gear drive is employed here. The phase regulating speed reducer 5 is constructed with annular rigid internal gears 51 and 52 arranged in parallel in coaxial condition, an annular flexible external gear 53 arranged at inside of the annular rigid internal gears, and a wave generator 54 engaged therein. The wave generator 54 has an elliptically shaped contour. By the wave generator, the flexible external gear 53 is deflected into an elliptic shaped configuration. Both end portions in major axis direction thereof are engaged with the rigid internal gears 51 and 52. When the wave generator 54 is rotated, the meshing positions are moved in circumferential direction.

Here, the number of teeth of the flexible external gear 53 and that of teeth of the rigid internal gear 51 are the same. In contrast to this, the number of teeth of the other rigid internal gear 52 is greater than those of the flexible external gear 53 and the rigid internal gear 51 by two. Therefore, when the wave generator 54 is driven to rotate and whereby the meshing points between the flexible external gear 53 and the rigid internal gears 51 and 52 are moved in circumferential direction, no relative rotation is caused between the flexible external gear 53 and the rigid internal gear 51 having the same number of gear teeth, whereas the other rigid internal gear 52 causes relative rotation with respect to these gears 53 and 51. As a result, a high speed rotation input to the wave generator 54 can be output with significant reduction depending upon a difference of number of gear teeth of the gears 52 and 53 from the rigid internal gear 51 or 52. The speed reducer of this type have been disclosed in U.S. Pat. No. 4,974,470.

In the phase regulating speed reducer 5 of this construction, the wave generator 54 is driven by a phase regulating motor 6. On the other hand, a gear 7 is rigidly fixed on the outer periphery of the rigid internal gear 51. This gear 7 is meshed with a gear 8 mounted on a rotary shaft 2a of the roll 2. Also, on the outer periphery of the other rigid internal gear 52, a gear 9 is rigidly fixed. The gear 9 is meshed with a gear 11 mounted on a rotary shaft 3a of the roll 3.

In the phase regulating apparatus 1, the phase regulating motor 6 is not driven for applying brake in normal operation. The roll 2 is driven by the driving motor 4. On the other hand, the roll 3 is driven by the driving motor 4 via gear trains 9 and 11 and via a transmission path reaching from the rotary shaft 2a of the roll 2 to the rotary shaft 3a of the roll 3 through gear trains 8 and 7, a phase regulating speed reducer 5 and the gear trains 9 and 11.

Next, at occurrence of necessity of phase adjustment for the roll 3 relative to the roll 2, the phase regulating speed reducer 5 is driven by the phase regulating motor 6.

As set forth above, conventionally, the wave gear drive is utilized as the phase regulating speed reducer for driving the speed reducer upon phase regulation to transmit rotation of the driving motor to the roll 3 side with slightly acceleration or deceleration for adjusting the phases between the rolls 2 and 3. On the other hand, when phase regulation is not necessary, a rotational force of the driving motor is transmitted to the roll 3 side via the speed reducer.

Here, in the conventional phase regulating apparatus, the speed reducer 5 is active even in normal operation to effect speed reducing operation. Accordingly, by appropriately setting number of gear teeth of the gear trains 8 and 7 on input side and gear trains 9 and 11 on output side, speed reducing operation of the speed reducer 5 is canceled.

DISCLOSURE OF THE INVENTION

An object of the present invention is to propose a phase regulating apparatus, in which a ratio of input and output rotation speeds is one to one.

On the other hand, an object of the present invention is to propose a phase regulating apparatus which achieves high precision of rotational angle transmission and can be manufactured at low cost, employing a novel phase regulating speed reducer.

In order to accomplish the above-mentioned object, the present invention is characterized by the following feature in a phase regulating speed reducer arranged in a rotational force transmission path between first and second rotary bodies, and being driven by a phase regulating motor for performing phase regulation of the first and second rotary bodies.

Namely, the phase regulating speed reducer has first and second wave gear drives arranged in parallel relationship with each other in coaxial condition relative to each other.

The first wave gear drive includes an annular first rigid internal gear, a cup-shaped first flexible external gear arranged inside of the first rigid internal gear, and a wave generator arranged inside of the first flexible external gear, deforming the first flexible external gear in a radial direction for partially meshing with the first rigid internal gear, and the first wave generator being coupled with a phase regulating motor.

On the other hand, the second wave gear drive includes an annular second rigid internal gear, a cup-shaped second flexible external gear arranged inside of the second rigid internal gear, and a wave generator arranged inside of the second flexible external gear, deforming the second flexible external gear in a radial direction for partially meshing with the second rigid internal gear, and the second wave generator being coupled with a phase regulating motor, the second flexible external gear being fixed with the first flexible external gear in back-to-back relationship for integral rotation, and the second wave generator being fixed in a non-rotatable state.

Also, at least one of the first and second rigid internal gear is input a rotation, and a rotational output is obtained from the other gear.

Here, the first and second flexible external gears are produced as an integral product.

On the other hand, as the first and second wave gear drives, the flexible external gear unit may be a silk hat type flexible external gear whose diaphragm portion is extended outward, in place of the cup-shaped flexible external gear unit.

Next, the present invention is characterized in the following constructions in a phase, regulating apparatus for performing phase regulation of first and second rotary bodies driven to rotation by the same driving motor, having a phase regulating speed reducer disposed in a rotational force transmission path from the driving motor to the second rotary body, and upon phase regulation, the phase regulating speed reducer being driven by a phase regulating motor Namely, the phase regulating speed reducer has first and second wave gear drives arranged in parallel relationship in coaxial state.

The first wave gear drive includes an annular first rigid internal gear, a cup-shaped first flexible external gear arranged inside of the first rigid internal gear, and a wave generator arranged inside of the first flexible external gear, deforming the first flexible external gear in a radial direction for partially meshing with the first rigid internal gear, and the first wave generator being coupled with a phase regulating motor.

On the other hand, the second wave gear drive includes an annular second rigid internal gear, a cup-shaped second flexible external gear arranged inside of the second rigid internal gear, and a wave generator arranged inside of the second flexible external gear, deforming the second flexible external gear in a radius direction for partially meshing with the second rigid internal gear, and the second wave generator being coupled with a phase regulating motor, the second flexible external gear being fixed with the first flexible external gear in back-to-back relationship for integral rotation, and the second wave generator being fixed in a non-rotatable state.

Furthermore, at least one of the first and second rigid internal gear is input a rotation, and a rotational output is obtained from the other gear.

Here, the first and second flexible external gears may be produced as an integral product. On the other hand,the first and second wave gear drives, may have a silk hat shaped flexible external gear whose diaphragm portion is extended outwardly, in place of the cup-shaped flexible external gear.

BEST MODE FOR CARRYING OUT THE INVENTION

A phase regulating apparatus, to which the present invention is applied, will be discussed hereinafter with reference to the drawings.

Figure 1:
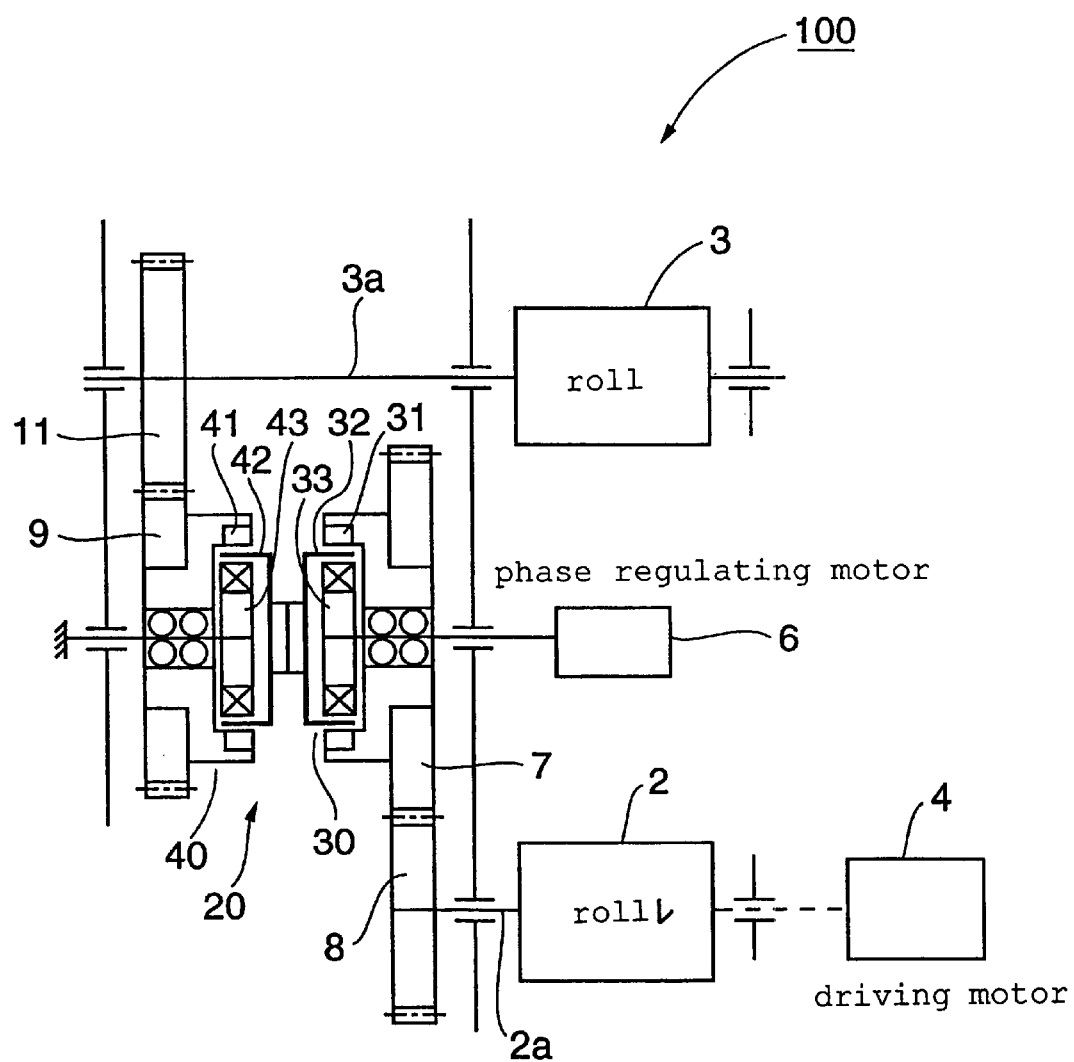
FIG. 1 is an illustration of a general construction of a phase regulating apparatus, to which the present invention is applied.
Figure 5:
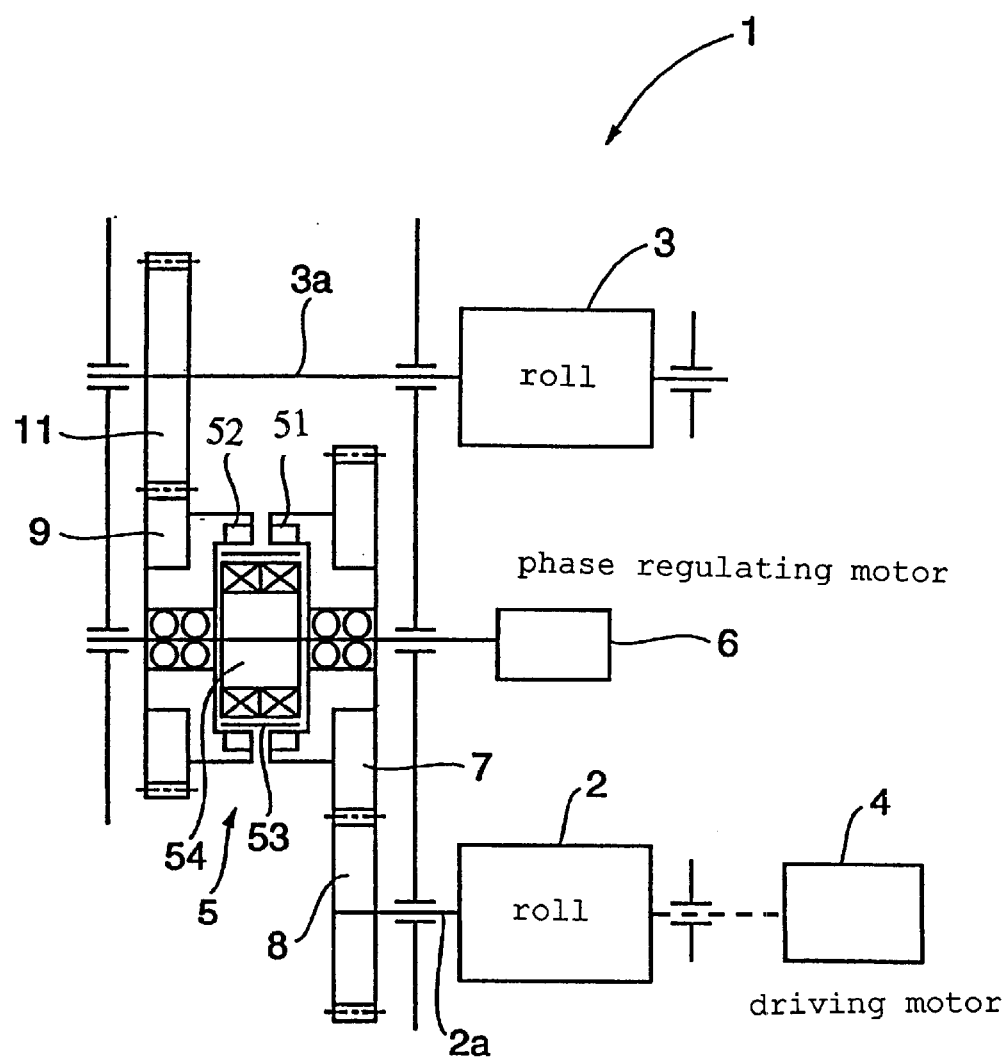
FIG. 5 is an illustration showing a general construction of the conventional phase regulating apparatus.

FIG. 1 is an illustration of a general construction of a phase regulating apparatus, to which the present invention is applied. As shown in FIG. 1, a basic construction of the shown embodiment of a phase regulating apparatus 100 is similar to the conventional phase regulating apparatus shown in FIG. 5.

Namely, the phase regulating apparatus 100 is adapted for phase regulation between a printing rolls 2 and 3, wherein these rolls 2 and 3 are driven to rotate by the same driving motor 4. A roll 3 side is driven by the driving motor 4 via a rotational force transmission path formed with a gear train and a phase regulating speed reducer 20.

Figure 2:
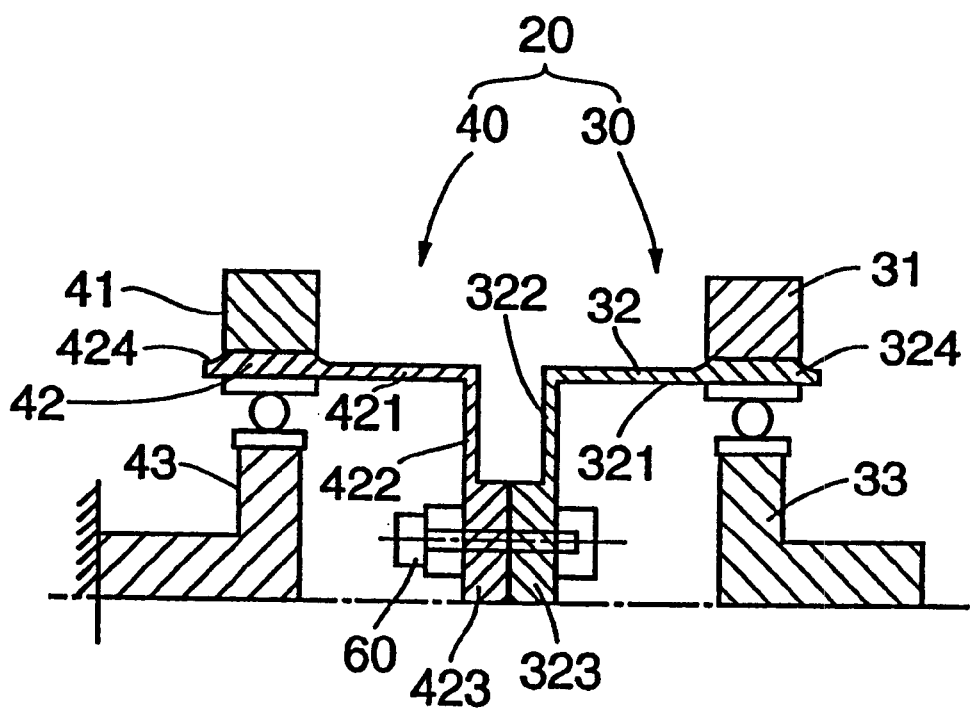
FIG. 2 is a half section showing a general construction of a phase regulating speed reducer of FIG. 1.

With also reference to FIG. 2, a construction of the phase regulating speed reducer 20 will be discussed. The phase regulating speed reducer 20 includes a cup type first wave gear drive 30 and a cup type second wave gear drive 40.

The first wave gear drive 30 includes an annular first rigid internal gear 31, a cup-shaped first flexible external gear 32 arranged inside of the first rigid internal gear 31, and a first wave generator 33 which is arranged inside of the first flexible external gear and deflects the first flexible external gear 32 in radial direction to partially mesh with the first rigid internal gear 31. The first wave generator 33 is connected to the phase regulating motor 6.

On the other hand, similarly, the second wave gear derive 40 includes an annular second rigid internal gear 41, a cup-shaped second flexible external gear 42 arranged inside of the second rigid internal gear, and a second wave generator 43 which is arranged inside of the second flexible external gear and deflects the second flexible external gear 42 in radial direction to partially mesh with the second rigid internal gear 41.

It should be noted that the constructions respectively similar to the first and second wave gear drives 30 and 40 have been disclosed in U.S. Pat. No. 5,269,202, for example.

In the first and second wave gear drives, the first flexible external gear 32 includes a cylindrical body portion 321, an annular diaphragm 322 sealing one end of the body portion 321, a boss 323 integrally formed at a center of the diaphragm 322, and an external gear 324 formed on the outer peripheral surface on an opening end side of the body portion 321, and formed into a cup-shaped configuration. Similarly, the second flexible external gear 42 includes a cylindrical body portion 421, an annular diaphragm 422 sealing one end of the body portion 421, a boss 423 integrally formed at a center of the diaphragm 422, and an external gear 424 formed on the outer peripheral surface on an opening end side of the body portion 421, and formed into a cup-shaped configuration.

Here, the first flexible external gear 32 and the second flexible external gear 42 are fixed with each other in back-to-back relationship for rotation with integrity. Namely, portions of both bosses 323 and 423 are fixed by a plurality of fastening bolts 60.

On the other hand, the second wave generator 43 in the second wave gear drive 40 is fixed in non-rotatable condition.

Furthermore, in the phase regulating speed reducer 20 in the construction set forth above, the first rigid internal gear 31 of the first wave gear drive 30 is coupled with the roll 2 side via the gear trains 7 and 8. Namely, rotation from the driving motor 4 is input. In contrast to this, the rigid internal gear 41 of the second wave gear drive 40 is coupled with the other roll 3 side via the gear trains 9 and 11. Namely, it serves as rotation output side. It may be possible to set to reverse the relationship between the rotation input side and the rotation output side.

Here, the number of the gear teeth of the rigid internal gears 31 and 41 of the first and second wave gear drives 30 and 40 are set to be the same. On the other hand, the number of the gear teeth of the flexible external gears 32 and 42 are set to be the same.

The operation of the phase regulating apparatus 100 having the phase regulating speed reducer 20 of this construction will be discussed. In normal power transmitting condition, a brake is applied to the phase regulating motor 6, the wave generator 33 of the first wave gear drive 30 is fixed. On the other hand, the wave generator 43 of the second wave gear drive 40 is held in constantly fixed condition.

Accordingly, rotation input from the first rigid internal gear 31 is transmitted to the second rigid internal gear 41 via the first flexible external gear 32 and the second flexible external gear 42 to output rotation at the same rotation speed as the input rotation speed from the second rigid internal gear 41. Thus, at the normal condition, the phase regulating speed reducer 20 does not perform speed reducing operation to serve as simple rotational force transmitting element.

Next, when phase regulation is necessary, the phase adjusting motor 6 is driven to rotate the wave generator 33 of the first wave gear drive 30. As a result, the meshing positions between the flexible external gear 32 and the rigid internal gear 31 of the first wave gear drive 30 are moved in the circumferential direction to cause relative rotation due to difference in the number of gear teeth of both gears.

Here, since the meshing positions between the flexible external gear 42 and the rigid internal gear 41 of the second wave gear drive 40 are fixed without causing movement, the flexible external gear 42 does not rotate. Accordingly, the flexible external gear 32 connected to the flexible external gear 42 is not rotated.

As a result, a relative rotation between the relative external gear 32 and the rigid internal gear 31 caused by driving the phase regulating motor 6 becomes the rotation of the rigid internal gear 31. In other words, the rigid internal gear 31 rotates relatively with respect to the other rigid internal gear 41 to vary rotating phases of the first and second rigid internal gears 31 and 41.

As set forth above, by controlling rotational amount and rotating direction of the phase regulating motor, the phase condition between the rolls 2 and 3 can be adjusted to the optimal condition.

Figure 3:
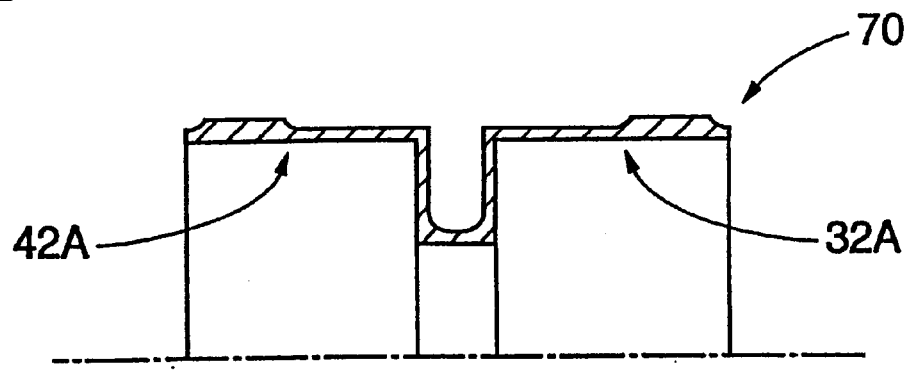
FIG. 3 is a half section showing a modification of a flexible external gear in the phase regulating speed reducer of FIG. 2.

It should be noted that the first and second flexible external gears 32 and 42 connected with each other may be produced as integral product. FIG. 3 shows a half section of the integral type flexible external gear 70 produced as integral product and having portions 32A and 42A corresponding to the first and second flexible external gears 32 and 42.

(Other Embodiment)

The foregoing discussion has been given for the case where the present invention is realized by employing the cup type wave gear drive. The present invention may also be realized by employing a silk hat type wave gear drive. The silk hat type wave gear drive is generally referred to as this since it has the flexible external gear of silk hat shaped configuration, as disclosed in U.S. Pat. No. 5,715,732, for example.

Figure 4:
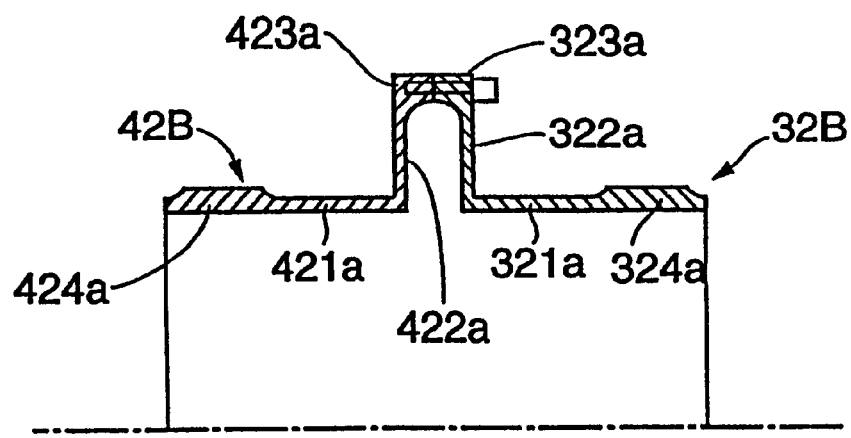
FIG. 4 is a half section showing a flexible external gear of a silk hat type wave gear drive applicable for the phase regulating speed reducer of FIG. 2.

In FIG. 4, there is shown a half section in the case where the silk hat shaped flexible external gears are connected in back-to-back relationship in the silk hat type wave gear drive. As shown in FIG. 4, the first flexible external gear 32B is constructed into a silk hat shape with a cylindrical body portion 321a, an annular diaphragm 322a extending outwardly in radial direction from one opening edge, a boss 323a formed integrally with the diaphragm 322a and extended from an outer peripheral edge of the latter, and an external teeth 324 formed on the outer peripheral surface on the other opening end side of the body portion 321a, to be formed into a silk hat shaped configuration. Similarly, the second flexible external gear 42A is constructed into a silk hat shape with a cylindrical body portion 421a, an annular diaphragm 422a extending outwardly in radial direction from one opening edge, a boss 423a formed integrally with the diaphragm 322a and extended from an outer peripheral edge of the latter, and an external teeth 424 formed on the outer peripheral surface on the other opening end side of the body portion 421a, to be formed into a silk hat shaped configuration.

Industrial Applicability

As set forth above, in the phase regulating apparatus according to the present invention, a construction, in which two sets of cup type or silk hat type wave gear drives in back-to-back relationship, and flexible external gears as components thereof are coupled for integral rotation, is employed to form the phase regulating speed reducer having a ratio of input and output rotation speed of 1:1.

Accordingly by employing the phase regulating speed reducer of the present invention, it becomes possible to produce the phase regulating apparatus having high rotation transmitting precision at low cost.

What is claimed is:

1. A phase regulating speed reducer arranged in a rotational force transmission path between first and second rotary bodies, and being driven by a phase regulating motor for performing phase regulation of said first and second rotary bodies, comprising:

first and second wave gear drives arranged in parallel relationship with each other in coaxial condition relative to each other, said first wave gear drive including an annular first rigid internal gear, a cup-shaped first flexible external gear arranged inside of said first rigid internal gear, and a first wave generator arranged inside of said first flexible external gear, deforming said first flexible external gear in a radial direction for partially meshing with said first rigid internal gear, and said first wave generator being coupled with the phase regulating motor, said second wave gear drive including an annular second rigid internal gear, a cup-shaped second flexible external gear arranged inside of said second rigid internal gear, and a second wave generator arranged inside of said second flexible external gear, deforming said second flexible external gear in a radial direction for partially meshing with said second rigid internal gear, and said second flexible external gear being fixed with said first flexible external gear in back-to-back relationship for integral rotation, and said second wave generator being fixed in a non-rotatable state;

at least one of said first and second rigid internal gear being input a rotation, and a rotational output being obtained from the other gear;

wherein said first and second flexible external gears are produced as an integral product.

2. A phase regulating apparatus for performing phase regulation of first and second rotary bodies driven to rotation by the same driving motor, having a phase regulating speed reducer disposed in a rotational force transmission path from said driving motor to said second rotary body, and upon phase regulation, said phase regulating speed reducer being driven by a phase regulating motor, comprising;

said phase regulating speed reducer having first and second wave gear drives arranged in parallel relationship in coaxial state, said first wave gear drive including an annular first rigid internal gear, a cup-shaped first flexible external gear arranged inside of said first rigid internal gear, and a first wave generator arranged inside of said first flexible external gear, deforming said first flexible external gear in a radial direction for partially meshing with said first rigid internal gear, and said first wave generator being coupled with the phase regulating motor, said second wave gear drive including an annular second rigid internal gear, a cup-shaped second flexible external gear arranged inside of said second rigid internal gear, and a second wave generator arranged inside of said second flexible external gear, deforming said second flexible external gear in a radial direction for partially meshing with said second rigid internal gear, and said second wave generator being fixed in a non-rotatable state, said second flexible external gear being fixed with said first flexible external gear in back-to-back relationship for integral rotation;

at least one of said first and second rigid internal gear being input a rotation, and a rotational output being obtained from the other gear;

wherein said first and second flexible external gears are produced as an integral product.

3. A phase regulating speed reducer arranged in a rotational force transmission path between first and second rotary bodies, and being driven by a phase regulating motor for performing phase regulation of said first and second rotary bodies, comprising:

first and second wave gear drives arranged in parallel relationship with each other in coaxial condition relative to each other, said first wave gear drive including an annular first rigid internal gear, a silk hat type first flexible external gear arranged inside of said first rigid internal gear, and a first wave generator arranged inside of said first flexible external gear, deforming said first flexible external gear in a radial direction for partially meshing with said first rigid internal gear, and said first wave generator being coupled with a phase regulating motor, said second wave gear drive including an annular second rigid internal gear, a silk hat type second flexible external gear arranged inside of said second rigid internal gear, and a second wave generator arranged inside of said second flexible external gear, deforming said second flexible external gear in a radial direction for partially meshing with said second rigid internal gear, said second flexible external gear being fixed with said first flexible external gear in back-to-back relationship for integral rotation, and said second wave generator being fixed in a non-rotatable state, at least one of said first and second rigid internal gear, being input a rotation, and a rotational output being obtained from the other gear, and wherein said first and second flexible external gears are produced as an integral product.

4. A phase regulating apparatus for performing phase regulation of first and second rotary bodies driven to rotation by the same driving motor, having a phase regulating speed reducer disposed in a rotational force transmission path from said driving motor to said second rotary body, and upon phase regulation, said phase regulating speed reducer being driven by a phase regulating motor, comprising;

said phase regulating speed reducer having first and second wave gear drives arranged in parallel relationship in coaxial state, said first wave gear drive including an annular first rigid internal gear, a silk hat type first flexible external gear arranged inside of said first rigid internal gear, and a first wave generator arranged inside of said first flexible external gear, deforming said first flexible external gear in a radial direction for partially meshing with said first rigid internal gear, and said first wave generator being coupled with the phase regulating motor, said second wave gear drive including an annular second rigid internal gear, a silk hat type second flexible external gear arranged inside of said second rigid internal gear, and a second wave generator arranged inside of said second flexible external gear, deforming said second flexible external gear in a radial direction for partially meshing with said second rigid internal gear, and said second wave generator being fixed in a non-rotatable state, said second flexible external gear being fixed with said first flexible external gear in back-to-back relationship for integral rotation, at least one of said first and second rigid internal gear and being input a rotation, and a rotational output being obtained from the other gear, wherein said first and second flexible external gears are produced as an integral product.

* * * * *